(12) United States Patent
Privett et al.

(10) Patent No.: US 12,441,029 B2
(45) Date of Patent: Oct. 14, 2025

(54) RECYCLING OF FIBER-REINFORCED COMPOSITE MATERIAL USING ELECTROMAGNETIC RADIATION

(71) Applicant: Honeywell Federal Manufacturing & Technologies, LLC, Kansas City, MO (US)

(72) Inventors: Mark H. Privett, Belton, MO (US); Danielle M. Coverdell, Blue Springs, MO (US); Susan R. Schickling, Kent, WA (US); Dwayne A. Hughes, Liberty, MO (US); Elizabeth Irene Reza, Overland Park, KS (US); Eric A. Eastwood, Raymore, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/884,608

(22) Filed: Sep. 13, 2024

(65) Prior Publication Data

US 2025/0091256 A1    Mar. 20, 2025

Related U.S. Application Data

(60) Provisional application No. 63/582,553, filed on Sep. 14, 2023.

(51) Int. Cl.
*B29B 17/02* (2006.01)
*C08J 11/06* (2006.01)
(Continued)

(52) U.S. Cl.
CPC .............. *B29B 17/02* (2013.01); *C08J 11/06* (2013.01); *B29B 2017/0213* (2013.01);
(Continued)

(58) Field of Classification Search
CPC .. B29B 17/02; B29B 2017/0213; C08J 11/06; C08J 2335/06; B29K 2309/08;
(Continued)

(56) References Cited

U.S. PATENT DOCUMENTS

2012/0132732 A1*   5/2012   Bentaj ................... B29B 17/02
                                                                    241/1

FOREIGN PATENT DOCUMENTS

TW            I663192 B  *   6/2019   ............. B29B 17/04

OTHER PUBLICATIONS

Machine Translation of TW I663192 by Wang. (Year: 2019).*
(Continued)

*Primary Examiner* — Christina H. W. Rosebach
(74) *Attorney, Agent, or Firm* — Erise IP, P.A.

(57) ABSTRACT

Systems, methods, and devices for providing a recycling technique for fiber-reinforced composite material using electromagnetic radiation. The recycling technique comprising selecting one or more parameters for a microwave system, orienting the fiber-reinforced composite material within a microwave chamber of the microwave system, microwaving the fiber-reinforced composite material using electromagnetic radiation based on the selected one or more parameters to expel a plurality of fibers from the fiber-reinforced composite material, and collecting the expelled plurality of fibers and remaining matrix material from the microwave chamber.

20 Claims, 9 Drawing Sheets

(51) Int. Cl.
  *B29K 25/00* (2006.01)
  *B29K 105/06* (2006.01)
  *B29K 105/08* (2006.01)
  *B29K 105/12* (2006.01)
  *B29K 309/08* (2006.01)

(52) U.S. Cl.
  CPC ...... *B29K 2025/00* (2013.01); *B29K 2105/06* (2013.01); *B29K 2105/08* (2013.01); *B29K 2105/12* (2013.01); *B29K 2309/08* (2013.01); *C08J 2335/06* (2013.01); *Y02W 30/62* (2015.05)

(58) Field of Classification Search
  CPC ............ B29K 2105/06; B29K 2105/08; B29K 2105/12; Y02W 30/62
  See application file for complete search history.

(56) References Cited

OTHER PUBLICATIONS

Antonio, C. et al. Comparison of linear and non-linear sweep rate regimes in variable frequency microwave technique for uniform heating in materials processing. Journal of Materials Processing Technology 169 (2005) 234-241 (Year: 2005).*
Machine translation of CN 109320762 (Year: 2019).*
Derwent abstract of CN 109320762 by Wang et al. (Year: 2019).*

* cited by examiner

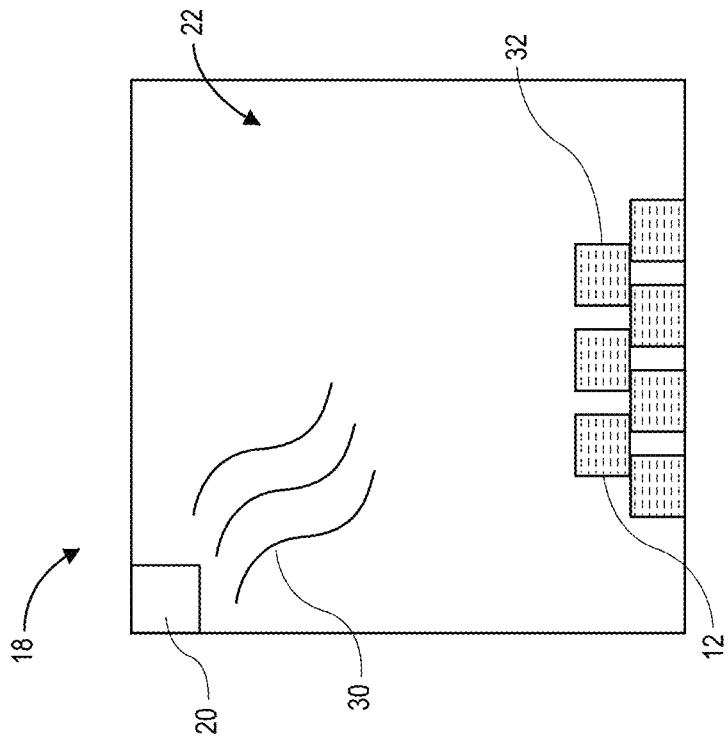
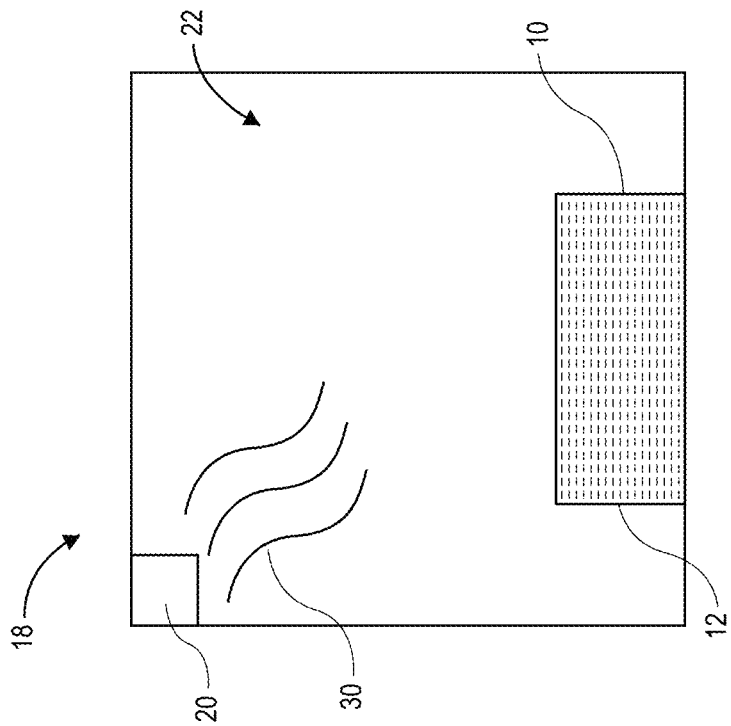

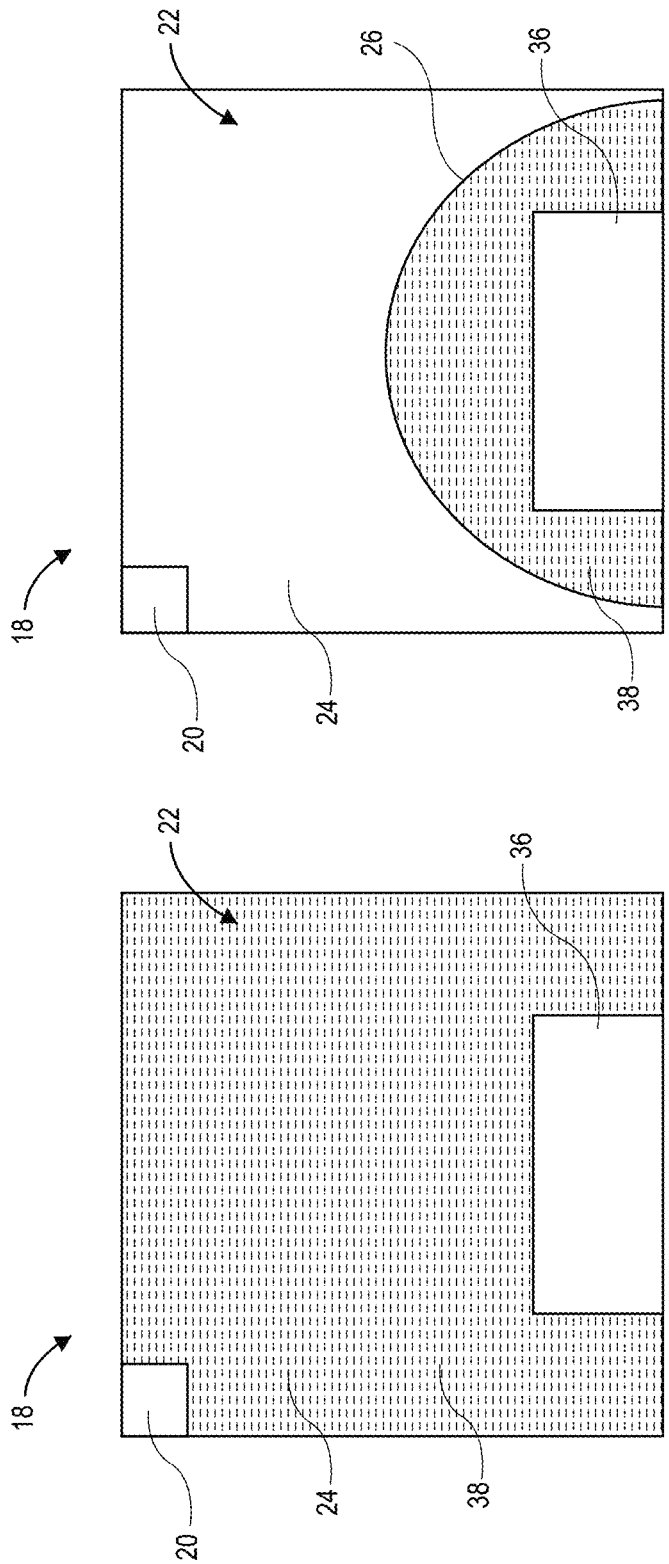

RECYCLING OF FIBER-REINFORCED COMPOSITE MATERIAL USING ELECTROMAGNETIC RADIATION

CROSS-REFERENCE TO RELATED APPLICATIONS

This patent application claims priority benefit, with regard to all common subject matter, of U.S. Provisional Patent Application No. 63/582,553, filed Sep. 14, 2023, and entitled "RECYCLING OF FIBER-REINFORCED COMPOSITE MATERIAL USING MICROWAVE ENERGY." The above-referenced application is hereby incorporated by reference in its entirety into the present application.

STATEMENT OF GOVERNMENT SUPPORT

This invention was made with government support under contract number DE-NA0002839 awarded by the United States Department of Energy/National Nuclear Security Administration. The government has certain rights in the invention.

BACKGROUND

1. Field

Embodiments of the present disclosure generally relate to the recycling of fiber-reinforced composite material. More specifically, embodiments of the present disclosure relate to using electromagnetic radiation, such as radio frequency radiation or microwave radiation, to expel fibers from fiber-reinforced composite material.

2. Related Art

Fiber-reinforced composites such as carbon fiber-reinforced polymers have been used to make a variety of parts in many industries. For example, fiber-reinforced composites are used to make parts of aircrafts, boats, trains, cars, and wind turbines. Further, fiber-reinforced composites are expanding into other industries and are becoming prevalent in daily life. However, fiber-reinforced composites are difficult to recycle due to the fibers being interspersed within the matrix material. Current methods of dealing with fiber-reinforced composites include incineration or burying in a landfill. Said methods incur more expensive production costs of new fiber-reinforced composites, as well as the costs of disposing of old fiber-reinforced composites.

SUMMARY

Embodiments of the present disclosure solve the above-mentioned problems by providing systems, methods, and devices for recycling fiber-reinforced composite material by utilizing electromagnetic radiation to separate fiber materials from the composite materials that allows for the recycling of the fiber and composite materials. Embodiments of the present disclosure avoid the high costs of producing new fiber-reinforced composite material and the wastefulness of disposing of fiber-reinforced composite material through incineration or landfilling.

In some aspects, the techniques described herein relate to a method for removing fibers from a fiber-reinforced composite material via electromagnetic radiation to prepare for a recycling process, the method including: placing the fiber-reinforced composite material within a microwave chamber, the fiber-reinforced composite material including glass fibers within a polymer matrix; causing the glass fibers to be expelled from the polymer matrix by exposing the fiber-reinforced composite material to variable-frequency electromagnetic radiation; and separating the glass fibers from the polymer matrix to render the polymer matrix suitable for the recycling process.

In some aspects, the techniques described herein relate to a method, further including: prior to microwaving, processing the fiber-reinforced composite material to increase a surface area of the fiber-reinforced composite material.

In some aspects, the techniques described herein relate to a method, further including: prior to microwaving, covering the fiber-reinforced composite material with an electromagnetic-radiation-permeable cover to contain the glass fibers expelled from the polymer matrix.

In some aspects, the techniques described herein relate to a method, wherein the fiber-reinforced composite material is exposed to the variable-frequency electromagnetic radiation to increase a temperature of the fiber-reinforced composite material at a predetermined ramp rate until the fiber-reinforced composite material reaches a predetermined target temperature and held at the predetermined target temperature for a predetermined hold time.

In some aspects, the techniques described herein relate to a method, wherein the predetermined ramp rate is 5° C. per minute and the predetermined hold time is at least 7 minutes.

In some aspects, the techniques described herein relate to a method, wherein the variable-frequency electromagnetic radiation is within a frequency range of 27 MHz to 300 GHz.

In some aspects, the techniques described herein relate to a method, further including: after exposing the fiber-reinforced composite material to the variable-frequency electromagnetic radiation, reorientating the fiber-reinforced composite material within the microwave chamber; and after reorientating the fiber-reinforced composite material, exposing the fiber-reinforced composite material to further variable-frequency electromagnetic radiation.

In some aspects, the techniques described herein relate to a method for removing fibers from a fiber-reinforced composite material via electromagnetic radiation to prepare for a recycling process, the method including: placing the fiber-reinforced composite material within a microwave chamber, the fiber-reinforced composite material including reinforcing fibers within a polymer matrix; causing the reinforcing fibers to be expelled from the polymer matrix by exposing the fiber-reinforced composite material to variable-frequency electromagnetic radiation to increase a temperature of the fiber-reinforced composite material at a predetermined ramp rate until the fiber-reinforced composite material reaches a predetermined target temperature and held at the predetermined target temperature for a predetermined hold time; and separating the reinforcing fibers from the polymer matrix to render the polymer matrix suitable for the recycling process.

In some aspects, the techniques described herein relate to a method, wherein the reinforcing fibers are a material selected from a set consisting of glass fibers, carbon fibers, metallic fibers, nylon fibers, organic fibers, silicon oxide fibers, or Kevlar® fibers.

In some aspects, the techniques described herein relate to a method, wherein the polymer matrix includes diallyl phthalate.

In some aspects, the techniques described herein relate to a method, wherein the fiber-reinforced composite material is exposed to the variable-frequency electromagnetic radiation by passing it through the microwave chamber on a conveyor belt for a predetermined number of cycles.

In some aspects, the techniques described herein relate to a method, wherein the predetermined target temperature is within a range from 170° C. to 180° C.

In some aspects, the techniques described herein relate to a method, wherein the predetermined ramp rate is at least 5° C. per minute.

In some aspects, the techniques described herein relate to a method, wherein the variable-frequency electromagnetic radiation is in a frequency range of 5.85 Ghz to 6.65 GHz.

In some aspects, the techniques described herein relate to a method for removing fibers from a fiber-reinforced composite material via electromagnetic radiation, the method including: placing the fiber-reinforced composite material within a microwave chamber, the fiber-reinforced composite material including reinforcing fibers within a polymer matrix; causing the reinforcing fibers to be expelled from the polymer matrix by exposing the fiber-reinforced composite material to variable-frequency electromagnetic radiation; and collecting the reinforcing fibers expelled from the polymer matrix.

In some aspects, the techniques described herein relate to a method, wherein the reinforcing fibers are chopped-glass fiber fibers.

In some aspects, the techniques described herein relate to a method, wherein the reinforcing fibers are continuous fiber reinforcement fibers.

In some aspects, the techniques described herein relate to a method, wherein the variable-frequency electromagnetic radiation is in a frequency range of 10 MHz to 300 GHz.

In some aspects, the techniques described herein relate to a method, wherein the reinforcing fibers are collected from a sacrificial, microwave-permeable coating of the microwave chamber.

In some aspects, the techniques described herein relate to a method, wherein the fiber-reinforced composite material is exposed to the variable-frequency electromagnetic radiation for a time within a range of 5 minutes to 2 hours.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWINGS

Embodiments of the present disclosure are described in detail below with reference to the attached drawing figures, wherein:

FIG. 4A and FIG. 4B depict an exemplary side view of a microwave system microwaving fiber-reinforced composite material according to some embodiments;

FIG. 5A and FIG. 5B depict an exemplary side view of a microwave system after the microwaving is complete according to some embodiments;

Figure 1:
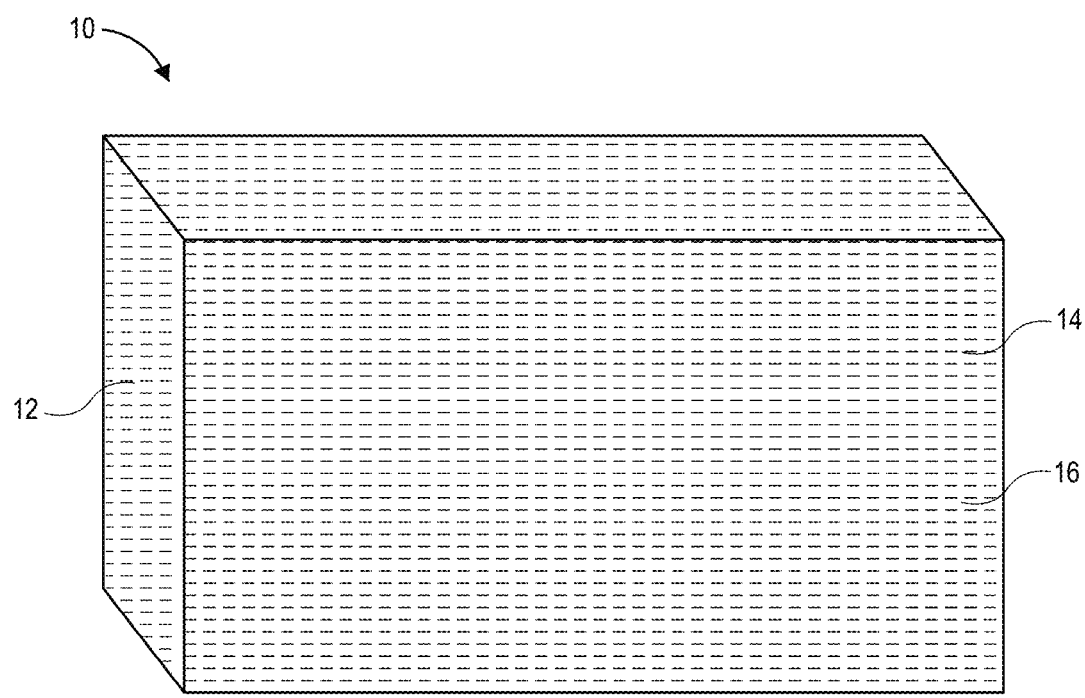
FIG. 1 depicts an exemplary composite part comprising a fiber-reinforced composite material according to some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Recycling of composite materials is sought after due to the possibility of reusing the fiber material, which is usually complicated and expensive to manufacture. Reusing the fiber and matrix materials to manufacture new composite parts may substantially reduce the high costs associated with producing fiber-reinforced composite parts. By recycling fiber-reinforced composites, overall composite waste that is transported to landfills or incinerated is reduced. Further, recycling avoids the high-cost, high-energy demand, and pollution associated with the above-mentioned disposal techniques of waste composites.

Embodiments of the present disclosure allow the fiber and matrix material to be reused separately by separating the materials using electromagnetic radiation. Embodiments of the present disclosure contemplate each material having little to no degradation of properties after being microwaved. In this description, references to "microwaving," "microwaved," or "microwave" mean expelling electromagnetic radiation, such as radio frequency and/or microwave radiation. For example, microwaving a composite part means expelling electromagnetic radiation towards the composite part. Further, expelling electromagnetic radiation may cause the object being microwaved to increase in temperature. Therefore, in some instances, references to "microwaving," "microwaved," or "microwave" may include heating with electromagnetic radiation.

FIG. 1 depicts an exemplary composite part 10 comprising a fiber-reinforced composite material 12. In some embodiments, the fiber-reinforced composite material 12 comprises a matrix material 14 and a fiber material 16. Matrix material 14 may comprise polymers, metals, ceramics, combinations thereof, or any other suitable matrix material. For example, the matrix material 14 may comprise a diallyl phthalate (DAP) polymer. Embodiments are contemplated in which the composite part 10 may comprise a different form of base material instead of a matrix-based material, such as a standard polymer or other material without a particular material matrix.

In some embodiments, the fiber material 16 may comprise any combination of glass fibers (including chopped glass fibers and continuous fibers), carbon fibers, metallic fibers, nylon fibers, organic fibers, silicon oxide fibers, or Kevlar® fibers, as well as other suitable fiber-like reinforcements. For example, the fiber material 16 may be a carbon fiber material such that fiber-reinforced composite material 12 is a carbon fiber-reinforced composite material. In some embodiments, the fiber material 16 may comprise any of calcium carbonate, hydrous aluminum silicate, alumina trihydrate, calcium sulfate, or fiberglass filler, as well as combinations thereof. For example, the fiber material 16 may comprise a fiberglass filler and be added to the matrix material 14. In some embodiments, the orientation of the fiber material 16 within the fiber-reinforced composite material 12 may comprise any of the following: randomly distributed, aligned, unidirectional, bidirectional, continuous, or any other suitable orientation. For example, the composite part 10 may comprise polymers with fiberglass reinforcement in an aligned orientation.

In some embodiments, the composite part 10 may be sourced from finished composite parts comprising fiber-reinforced composite material. For example, composite part 10 may be sourced from at least a portion of aircraft walls, boat hulls, train panels, truck hoods, or wind turbine blades, as well as other suitable products comprising a fiber-reinforced composite material. Embodiments are contemplated in which composite part 10 may be sourced from other forms of recycled components from various other industries such as, for example, pipes, aerospace components, or automotive components, as well as other suitable components made with fiber-reinforced composite material. For example, composite part 10 may be sourced from components of a product comprising carbon fiber-reinforced composite material.

In some embodiments, the composite part 10 may be a composite component recycled from any suitable industry or previous application. For example, the composite part 10 may comprise any of a recycled composite pipe, a recycled aerospace component (e.g., a plane wing or other component), a recycled vehicle component, or another suitable recycled composite component. In some embodiments, the fiber-reinforced composite material 12 may be cured or uncured. For example, composite part 10 may be sourced from a product comprising a cured fiber-reinforced composite material.

Figure 2:
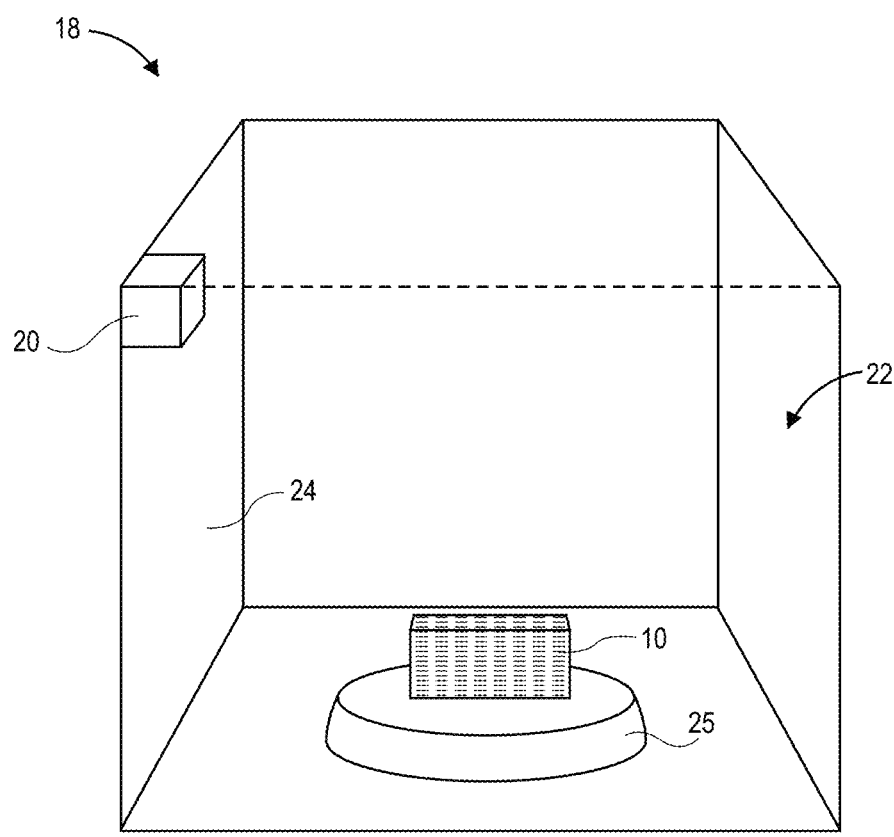
FIG. 2 depicts an exemplary microwave system for microwaving composite parts according to some embodiments.

FIG. 2 depicts an exemplary microwave system 18. Microwave system 18 may be utilized to microwave one or more objects, such as composite part 10 as described above. For example, microwave system 18 may provide electromagnetic radiation (e.g., radio frequency radiation and/or microwave radiation) to microwave composite part 10. In some embodiments, the microwave system 18 may comprise a radiation emission source 20 for providing electromagnetic radiation and a microwave chamber 22 for receiving the electromagnetic radiation provided by radiation emission source 20.

In some embodiments, radiation emission source 20 may provide electromagnetic radiation directly to microwave chamber 22. For example, radiation emission source 20 may be within or proximate microwave chamber 22 such that the electromagnetic radiation emitted from radiation emission source 20 is received directly by microwave chamber 22. Alternatively, or additionally, radiation emission source 20 may be redirected towards microwave chamber. For example, radiation emission source 20 may be a distance away from microwave chamber 22 such that the electromagnetic radiation is directed towards the microwave chamber 22 from the radiation emission source 20 via one or more wave guides.

In some embodiments, radiation emission source 20 may provide electromagnetic radiation in the form of radio frequency radiation and/or microwave radiation. For example, radiation emission source 20 may provide electromagnetic radiation within a range of 27 megahertz (MHz) to 300 gigahertz (GHz). Radiation emission source 20 may be a magnetron configured to provide electromagnetic radiation to microwave chamber 22. For example, microwave system 18 may comprise a magnetron (e.g., a cavity magnetron) for providing electromagnetic radiation to microwave chamber 22. Embodiments are contemplated in which radiation emission source 20 may be any suitable device configured to provide electromagnetic radiation to microwave system 18.

In some embodiments, microwave chamber 22 may have a volume of any shape. For example, the volume of the microwave chamber 22 may be cubic in shape, as depicted in FIG. 2. Additionally, or alternatively, in some embodiments, microwave chamber 22 may be other suitable shapes such as a cylindrical shape, spherical shape, or shapes built on other polygons provided they are orthotropic in various x, y, z axis orientations. Embodiments are contemplated in which the microwave chamber 22 comprises any suitable shape with curved or straight interior walls.

In some embodiments, the shape of the microwave system 18 may be selected to achieve a particular level of microwave mode density as mode formation enhances the coupling of the power of the microwave system 18 to the composite part being heated. Additionally, or alternatively, the shape of the microwave chamber 22 is selected based at least in part on the frequencies expelled into the microwave chamber 22. Embodiments are contemplated in which the shape and size of the microwave chamber 22 may be selected based at least in part on a shape and size of the composite part 10 such that the composite part 10 fits within microwave chamber 22. In some embodiments, the microwave chamber 22 may be defined by one or more interior walls 24 encompassing a volume for receiving electromagnetic radiation. Further, in some embodiments, the number of interior walls 24 depends at least in part on the shape of the microwave chamber 22.

Microwave chamber 22 may receive electromagnetic radiation (e.g., radio frequency radiation and/or microwave radiation) from microwave system 18. In some embodiments, microwave system 18 may comprise a variable-frequency microwave (VFM) to provide electromagnetic radiation. A VFM is a type of microwave that utilizes varying frequencies of electromagnetic radiation to eliminate high microwave field strength locations on the surface of materials receiving the electromagnetic radiation due to the relatively uniform microwaving provided by the VFM across the substrate when compared to conventional fixed-frequency microwaving. A VFM also allows for the ability to microwave metallic materials due to the varied frequency of the electromagnetic excitation eliminating the charge buildup on edges of metallic materials that results in arcing from fixed-frequency microwaving. Embodiments are contemplated in which microwave system 18 may comprise a conventional fixed-frequency microwave. For example, microwave system 18 may comprise a fixed-frequency microwave to provide electromagnetic radiation to non-metallic composite parts.

In some embodiments, the volume of the microwave chamber 22 may be less than 5 cubic feet ($ft^3$), less than 2 $ft^3$, less than 1 $ft^3$, within a range of 0.25 $ft^3$ to 30 cubic yards ($yd^3$), within a range of 1 $ft^3$ to 10 $yd^3$, within a range of 1 $ft^3$ to 5 $yd^3$, or within a range of 1 $ft^3$ to 1 $yd^3$. For example, the volume of microwave chamber 22 may be 1 $ft^3$. However, it should be understood that other sizes and volumes not explicitly described herein are contemplated for the microwave chamber 22. The microwave chamber 22 may be large enough such that at least a portion of aircraft walls, boat hulls, train panels, train panels, truck hoods, and wind turbine blades may be recycled. In some embodiments, the microwave chamber 22 may be large enough to fit entire composite parts as described herein into the microwave chamber 22. For example, the microwave chamber 22 may be large enough to fit an entire boat hull into the microwave chamber 22 without any preprocessing.

In some embodiments, the frequency of the electromagnetic radiation provided by microwave system 18 to microwave chamber 22 may be anywhere from 27 MHz to 300 GHz. In some embodiments, the microwave system 18 may be configured to be pressurized. For example, one or more pumps may be coupled to the microwave chamber 22 to selectively alter a pressure within the microwave chamber 22. Alternatively, or additionally, in some embodiments, the microwave system 18 may be configured to depressurize microwave chamber 22 to a pressure less than atmospheric pressure. For example, microwave system 18 may be configured to depressurize microwave chamber 22 to a vacuum state. Embodiments are also contemplated in which the microwave system 18 comprises an inert environment. For example, the microwave chamber 22 may be filled with inert gas to replace the air within the microwave chamber 22.

In some embodiments, microwave system 18 further comprises an elevation mechanism 25 configured to elevate composite part 10 within microwave chamber 22. In some embodiments, elevation mechanism 25 causes the composite part 10 to be a predetermined distance above the floor of microwave chamber 22. Further, the elevation of composite part 10 within microwave chamber 22 may range on the floor (i.e., a bottom interior wall) of microwave chamber 22 to the ceiling (i.e., a top interior wall) of microwave chamber 22. Accordingly, the elevation of composite part 10 within microwave chamber 22 may depend at least in part on the height of microwave chamber 22. In some embodiments, elevation mechanism 25 may elevate composite part 10 to a high microwave field strength location within microwave chamber 22. Elevation mechanism 25 may be any of a suspension device, an elevated platform, an elevation device, a turntable, as well as combinations thereof.

Embodiments are contemplated in which microwave system 18 may further comprise a turntable or conveyor belt configured to rotate or move composite part 10 within microwave chamber 22. For example, microwave system 18 may comprise a turntable for receipt of composite part 10 such that composite part 10 rotates within microwave chamber 22 while receiving electromagnetic radiation from microwave system 18. In some embodiments, using a turntable or other means of moving composite part 10 within microwave chamber 22 may reduce or eliminate low and/or high microwave field strength locations. Embodiments of a microwave system comprising a conveyor belt are described in more detail below at FIG. 9.

Figure 3:
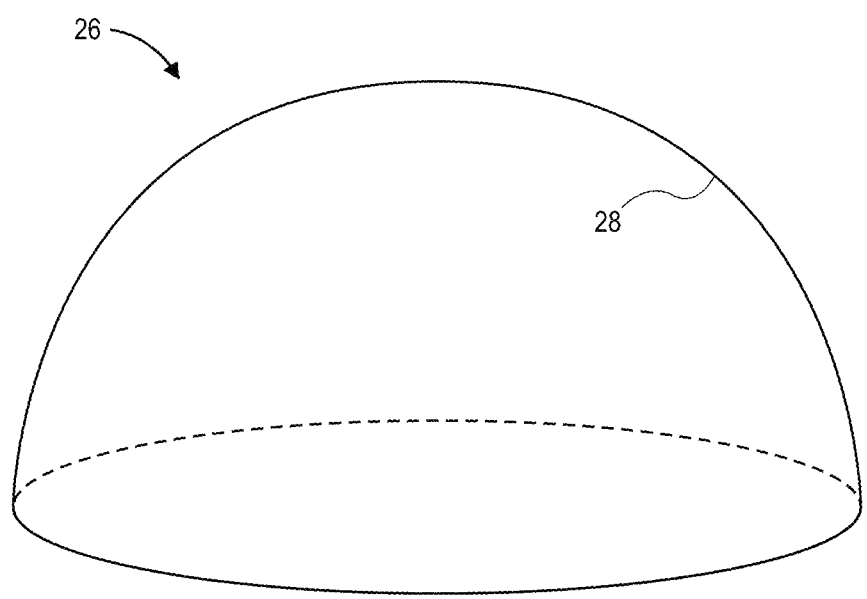
FIG. 3 depicts an exemplary fiber-catching device configured to intercept expelled fibers according to some embodiments.

FIG. 3 depicts an exemplary fiber-catching device 26. Fiber-catching device 26 may provide one or more layers of protection between composite part 10 and one or more interior walls 24 of microwave chamber 22. For example, fiber-catching device 26 may be positioned as a barrier between composite part 10 and one or more interior walls 24 of microwave chamber 22. Accordingly, fiber-catching device may be utilized to intercept fiber material 16 expelled from fiber-reinforced composite material 12 as described in more detail below. Fiber-catching device 26 may be larger in size in comparison to composite part 10 such that the composite part 10 may be disposed or housed within a volume encompassed by fiber-catching device 26. Additionally, the fiber-catching device 26 may be smaller than the microwave chamber 22 such that the fiber-catching device 26 may be inserted or disposed within the microwave chamber 22. In some embodiments, fiber-catching device 26 may intercept expelled fibers to prevent at least a portion of the expelled fibers from escaping a microwave chamber. For example, fiber-catching device 26 may provide a barrier between an interior volume of a microwave chamber and the environment around the microwave chamber.

In some embodiments, the fiber-catching device 26 may be configured to provide a barrier between composite part 10 and interior walls 24 of microwave chamber 22. For example, fiber-catching device 26 may be a dome-shaped layer positioned over composite part 10 to intercept at least a portion of fiber material 16 expelled from composite part 10. In some embodiments, the fiber-catching device 26 may be a coating or thin layer deposited onto interior walls 24 of the microwave chamber 22 such that the expelled fibers are intercepted by the fiber-catching device rather than the interior walls 24. Alternatively, fiber-catching device may be a thin layer of material disposed between composite part 10 and one or more interior walls 24 of microwave chamber 22. It should be understood that fiber-catching device 26 may comprise an internal surface 28 used for catching fibers that have been expelled. Further, internal surface 28 may intercept the expelled fibers such that the fibers are not expelled outside of a volume encompassed by fiber-catching device 26. For example, an internal surface 28 of a dome may prevent expelled fibers from escaping the volume encompassed by the dome.

In some embodiments, fiber-catching device 26 may be any of removable, sacrificial, temperature-resistant, or microwave-permeable, as well as combinations thereof. For example, fiber-catching device 26 may be microwave-permeable such that microwaves penetrate fiber-catching device 26 to microwave composite part 10 therein. In some embodiments, the fiber-catching device 26 may comprise a glass material, a silicon material, or a fused quartz material, as well as any other suitable material. For example, the fiber-catching device 26 may comprise a silicon or fused quartz material. In another example, the fiber-catching device 26 may be a glass dome configured to allow electromagnetic radiation to pass therethrough and be received by a fiber-reinforced composite part therein.

In some embodiments, the fiber-catching device 26 may be configured to withstand any of the following: high-pressure, low-pressure, or vacuum conditions. Embodiments are contemplated in which the fiber-catching device 26 may be removably couplable to one or more interior walls 24 of microwave chamber 22. For example, the fiber-catching device 26 may be mounted within microwave chamber 22 via any suitable fastener or mounting means, such as, bolts, clips, adhesive, or another suitable attachment means.

FIG. 4A and FIG. 4B depict exemplary side views of the microwave system 18 microwaving the fiber-reinforced composite material 12 via electromagnetic radiation 30. As depicted in FIG. 4A, microwave system 18 may microwave a composite part 10 comprising the fiber-reinforced composite material 12. As described above, the composite part 10 may comprise at least a portion of any of an aircraft wall, a boat hull, a train panel, a truck hood, or a wind turbine blade, as well as other suitable parts comprising a fiber-reinforced composite material. Embodiments are also contemplated in which a plurality of composite parts 10 are placed within the microwave chamber 22 to receive the electromagnetic radiation 30 from microwave system 18.

Alternatively, or additionally, microwave system 18 may microwave one or more preprocessed composite parts 32 comprising the fiber-reinforced composite material 12, as depicted in FIG. 4B. Preprocessed composite part 32 may be formed by preprocessing composite part 10 into one or more smaller pieces (i.e., preprocessed composite part 32). In some embodiments, preprocessing may include one or more of the following: shredding, chopping, cutting, mulching, or any other process suitable for reducing a size and/or increasing a surface area of an object. For example, preprocessed composite part 32 may be formed by cutting composite part 10 into one or more smaller pieces. In some embodiments, a plurality preprocessed composite parts 32 may be placed within the microwave chamber 22 to receive the electromagnetic radiation 30 from microwave system 18.

Microwave chamber 22 may microwave composite part 10 and/or preprocessed composite part 32 using electromagnetic radiation 30 emitted by radiation emission source 20. Accordingly, microwave system 18 may provide electromagnetic radiation 30 within the microwave chamber 22 to microwave composite part 10 and/or preprocessed composite part 32. The electromagnetic radiation 30 provided within microwave chamber 22 may be dependent on one or more parameters selected for microwave system 18. In some embodiments, the parameters may comprise any of frequency, power level, ramp rate, temperature, as well as combinations thereof. However, it should be understood that other parameters not explicitly described herein are contemplated.

The frequency of electromagnetic radiation 30 provided within microwave chamber 22 may be within a range of 10 MHz to 300 gigahertz GHz, within a range of 20 MHz to 300 GHz, within a range of 100 MHz to 300 GHz, within a range of 300 MHz to 300 GHz, within a range of 1 GHz to 300 GHz, or within a range of 5.85 GHz to 6.65 GHz. For example, radiation emission source 20 may provide electromagnetic radiation within a range of 27 MHz to 300 GHz. The power level of microwave system 18 may be within a range of 0% to 100%, within a range of 20% to 100%, within a range of 40% to 100%, or within a range of 60% to 100% of the maximum power output of microwave system 18. For example, microwave system 18 may be operated at a power level within the range of 40% to 100% of the maximum power output of microwave system 18. In some embodiments, the maximum power output of microwave system 18 may be within a range of 50 W to 2,000 W, within a range of 100 W to 1,000 W, within a range of 150 W to 500 W, within a range of 175 W to 250 W, within a range of 600 W to 1,700 W, within a range of 600 W to 800 W, within a range of 800 W to 1,000 W, or within a range of 1,000 W to 1,200 W. For example, the maximum power output may be 200 W for microwave system 18.

As used herein, "ramp rate" may refer to a rate of temperature change within the microwave chamber per unit of time. The ramp rate may be less than 15 degrees Celsius per minute (° C./min), less than 10° C./min, less than 5° C./min, within a range of 1° C./min to 15° C./min, within a range of 2° C./min to 10° C./min, or within a range from 2.5° C./min to 7.5° C./min. For example, the ramp rate may be 5° C./min. The temperature within microwave chamber 22 may be within a range of 20° C. to 300° C., within a range of 50° C. to 250° C., or within a range of 100° C. to 200° C. For example, the target temperature of microwave chamber 22 may be 175° C. As used herein, "target temperature" may refer to a temperature at which microwave system 18 is set to attempt to maintain. For example, having a target temperature of 175° C. may refer to microwave system 18 attempting to maintain a temperature of 175° C. and remain within a predetermined error range from the target temperature (e.g., within a range of 5° C. above and 5° C. below the target temperature).

In some embodiments, the parameters may be based at least in part on one or more properties of the fiber-reinforced composite material 12. Additionally, or alternatively, the parameters may be based at least in part on one or more properties of the microwave chamber 22. In some embodiments, the parameters may be selected to minimize damage to the composite part 10. Further, in some embodiments, the parameters may be selected to avoid excess heating of the fiber-reinforced composite material 12. In some embodiments, the parameters may be selected to expel a maximum amount of the fiber material 16 from composite part 10. For example, by minimizing damage and maximizing fiber expulsion, a polymer may be rendered suitable for recycling.

Embodiments are also contemplated in which one or more composite parts 10 and/or one or more preprocessed composite parts 32 may be placed on a turntable or conveyor belt configured to rotate or move one or more composite parts 10 and/or one or more preprocessed composite parts 32 within microwave chamber 22. For example, one or more preprocessed composite parts 32 may be placed on a conveyor belt configured to move the one or more preprocessed composite parts 32 through microwave chamber 22. Continuous microwave systems comprising one or more conveyor belts are described further below in FIG. 9.

FIG. 5A and FIG. 5B depict an exemplary side view of the microwave system 18 after microwaving composite part 10. The microwaving process at least partially expels the fiber material 16 from the composite part 10. In some embodiments, the composite part 10 expels most or all the fiber material 16 leaving behind a post-process matrix part 36. In some embodiments, composite part 10 may expel greater than 70%, greater than 75%, greater than 80%, greater than 85%, greater than 90%, greater than 95%, greater than 99%, or greater than 99.9% of fiber material 16. Further, expelling fiber material 16 may leave behind only the matrix material 14, such that post-process matrix part 36 comprising matrix material 14 is left behind. In some embodiments, the expelled fibers 38 are expelled toward the interior walls 24 of the microwave chamber 22. Further, in some embodiments, the expelled fibers 38 may at least partially cover one or more interior walls 24 of the microwave chamber 22, as depicted in FIG. 5A. In some embodiments, the fiber material 16 is expelled due to a transient dipole effect on the fiber material 16 polarizing the fiber material to the interior walls 24 of the microwave chamber 22.

In some embodiments, as depicted in FIG. 5B, a fiber-catching device 26 may be used such that the expelled fibers 38 are at least partially intercepted when traveling toward the interior walls 24 of the microwave chamber 22 and contained within the fiber-catching device 26. FIG. 5B depicts the fiber-catching device 26 intercepting and containing the expelled fibers 38 to prevent them from reaching one or more interior walls 24 of the microwave chamber 22. In some embodiments, the fiber-catching device 26 may be similar to the dome depicted in FIG. 3. In some embodiments, the fiber-catching device 26 may be a coating or thin layer added to the interior walls 24 of the microwave chamber 22. Further, in some embodiments, the fiber-catching device 26 may be at least one of the following: removable, sacrificial, temperature-resistant, and microwave-permeable. The fiber-catching device 26 may ease the collection and cleanup of the expelled fibers 38 in comparison to the collection and cleanup of the expelled fibers from the interior walls 24 of the microwave chamber 22 by reducing the total surface area receiving the expelled fibers.

The fiber-catching device 26 may be configured to cover any number of interior walls 24 of the microwave chamber 22. In some embodiments, one or more interior walls 24 may be protected from the expelled fibers 38. For example, the microwave chamber 22 may comprise sensitive equipment (e.g., a vent) on at least one interior wall, and require the fiber-catching device 26 to prevent the expelled fibers 38 from interacting with the sensitive equipment. Embodiments are contemplated in which fiber-catching device 26 does not prevent the expelled fibers from reaching every interior wall 24 of microwave chamber 22. For example, walls not comprising sensitive equipment (e.g., a bottom wall and/or floor of microwave chamber 22) may still receive the expelled fibers 38 while using fiber-catching device 26.

Figure 6:
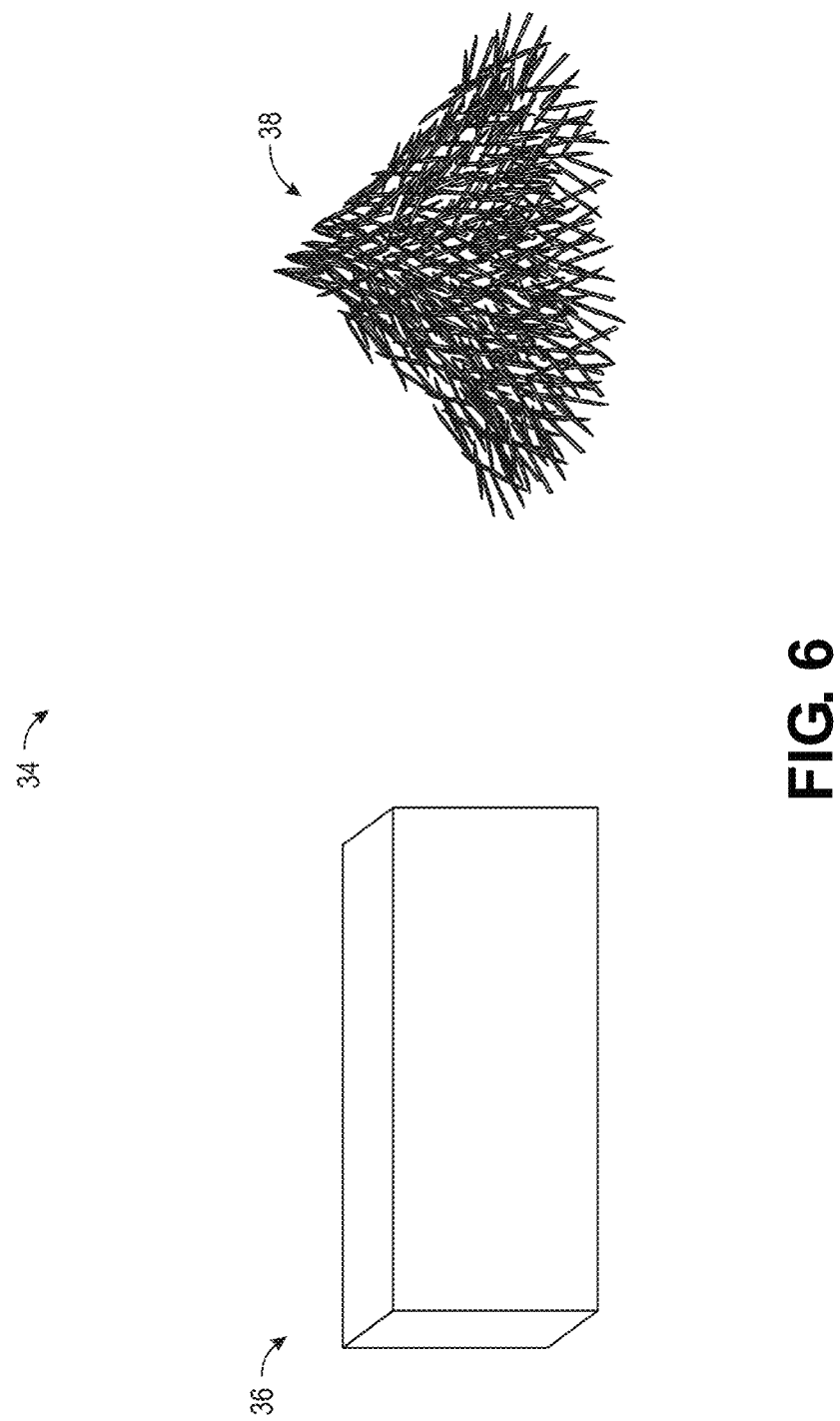
FIG. 6 depicts exemplary post-process materials collected after microwaving a composite part with electromagnetic radiation according to some embodiments.

FIG. 6 depicts exemplary post-process materials 34 collected after microwaving the composite part 10 with electromagnetic radiation 30. The post-process materials 34 may comprise a post-process matrix part 36 and expelled fibers 38. The post-process matrix part 36 comprises the matrix material 14 and little to no fiber material 16. For example, post-process matrix part 36 comprises less than 30%, less than 25%, less than 20%, less than 15%, less than 10%, less than 5%, less than 1%, or less than 0.1% fiber material 16. The expelled fibers 38 may be collected from the interior walls of the continuous microwave chamber 42 using at least one of a fiber-catching device 26, a moving mechanical collection technique, acoustical vibrations, or any other suitable collection technique. Embodiments are contemplated in which expelled fibers 38 are collected from the internal surface 28 of fiber-catching device 26 using at least one of a moving mechanical collection technique, acoustical vibrations, or any other suitable collection technique. For example, expelled fibers 38 may be collected from interior walls 24 of microwave chamber 22 and/or interior surface 28 of fiber-catching device 26 via scraping interior walls 24 and/or interior surface 28.

The post-process matrix part 36 may be reused to create different composite parts comprising the matrix material 14. For example, post-process matrix part 36 may be recycled and reinforced with a different fiber material to create a new composite part. Similarly, the expelled fibers 38 may be reused to create different composite parts comprising the fiber material 16. In some embodiments, the collected post-process matrix part 36 and expelled fibers 38 may have little to no damage (e.g., scorching or charring) after being microwaved using electromagnetic radiation 30. Further, in some embodiments, most or all the properties of the post-process materials 34 remain unchanged in comparison to the properties of their respective matrix material 14 and fiber material 16. For example, the matrix of the matrix material 14 may still be intact after being microwaved and expelling fiber material 16.

Figure 7:
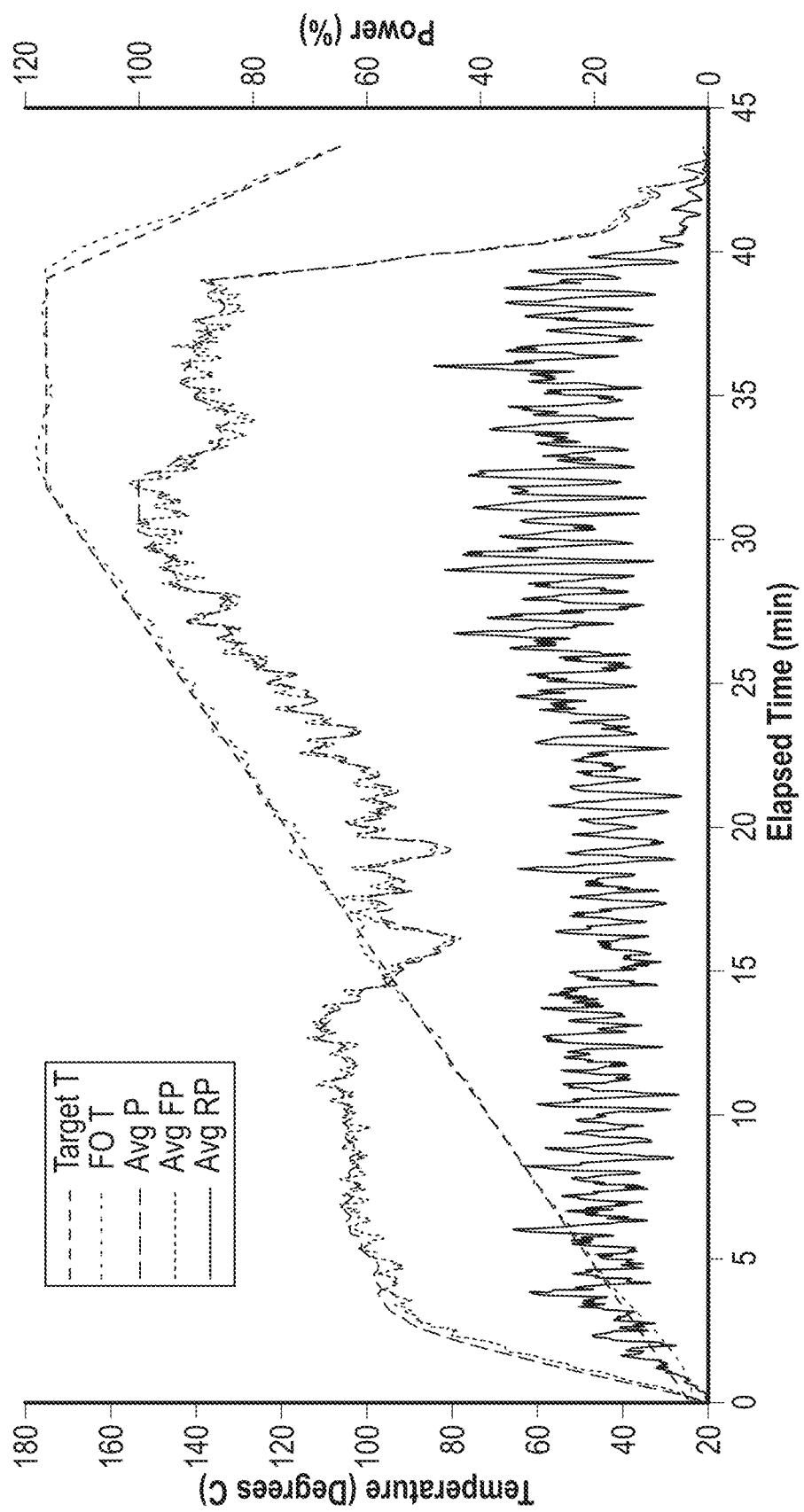
FIG. 7 depicts an exemplary graph including a target temperature of a composite part (Target T), a temperature of the composite part measured using a fiber optic probe (FO T), an average power set for the microwave system (Avg P), an average forward power in the microwave system (Avg FP), and an average reverse power in the microwave system (Avg RP) for an exemplary microwaving of the composite part according to some embodiments.

FIG. 7 depicts an exemplary graph including a target temperature of the composite part 10 (depicted as Target T), a temperature of the composite part 10 measured using a fiber optic probe (depicted as FO T), an average power for the microwave system 18 (depicted as Avg P), an average forward power in the microwave system 18 (depicted as Avg FP), and an average reverse power in the microwave system 18 (depicted as Avg RP) for an exemplary microwaving of composite part 10. As described above, a target temperature of the composite part 10 may refer to the temperature at which the composite part 10 is attempted to be maintained. Embodiments are contemplated in which the target temperature of the composite part 10 defines a ramp rate. As described above, the ramp rate may refer to the change in the target temperature of the composite part 10 over time. In some embodiments, the ramp rate may be within a range of 0° C. per second (° C./s) to 20° C./s, within a range of 0° C./s to 10° C./s, within a range of 0° C./min to 30° C./min, within a range of 0° C./min to 20° C./min, within a range of 0° C./min to 15° C./min, or within a range of 0° C./min to 10° C./min.

In some embodiments, the average power set for the microwave system is the power required to keep the temperature of the composite part 10 within a set error percentage of the target temperature of the composite part 10. The range for the set power may range from 0% to 100% of the maximum power output of the microwave system 18. For example, for a microwave system 18 having a maximum power output of 180 Watts (W), the power may range from 0 W to 180 W. In some embodiments, the maximum power output of microwave system 18 may be within a range of 50 W to 2,000 W, within a range of 100 W to 1,000 W, within a range of 150 W to 500 W, within a range of 175 W to 250 W, within a range of 600 W to 1,700 W, within a range of 600 W to 800 W, within a range of 800 W to 1,000 W, or within a range of 1,000 W to 1,200 W.

The average forward power may refer to the power coupled into the microwave system 18. The average forward power in the microwave chamber 22 may depend at least in part on the set power of the microwave chamber 22. In some embodiments, the average forward power may range from 0% to 100% of the maximum power output of the microwave system 18. The average reverse power may refer to the portion of power not coupled into the microwave system 18. In some embodiments, the average reverse power may range from 0% to 100% of the maximum power output of the microwave system 18.

In some embodiments, the microwave chamber 22 may be run in an open loop configuration in which there is no feedback to correct the parameters of the microwave system 18. Alternatively, or additionally, the microwave system 18 may be run in a closed loop configuration in which there is feedback to control the parameters of the microwave system 18. For example, the power of the microwave system 18 may be controlled using a closed loop configuration by measuring the actual power expelled by microwave system 18 and correcting the set power of microwave system 18 to correct the measured power to be within a range of error percentages from the desired power of microwave system 18. Further, for example, the power of the microwave may be adjusted such that the temperature of the composite part 10 is within a range of error percentages of the target temperature of the composite part 10.

As depicted in FIG. 7, the target temperature of composite part may be 175° C., the ramp rate may be 5° C./min, and the target temperature may be held for 7 minutes. The microwaving example depicted in FIG. 7 resulted in glass fiber expulsion from a composite part.

Figure 8:
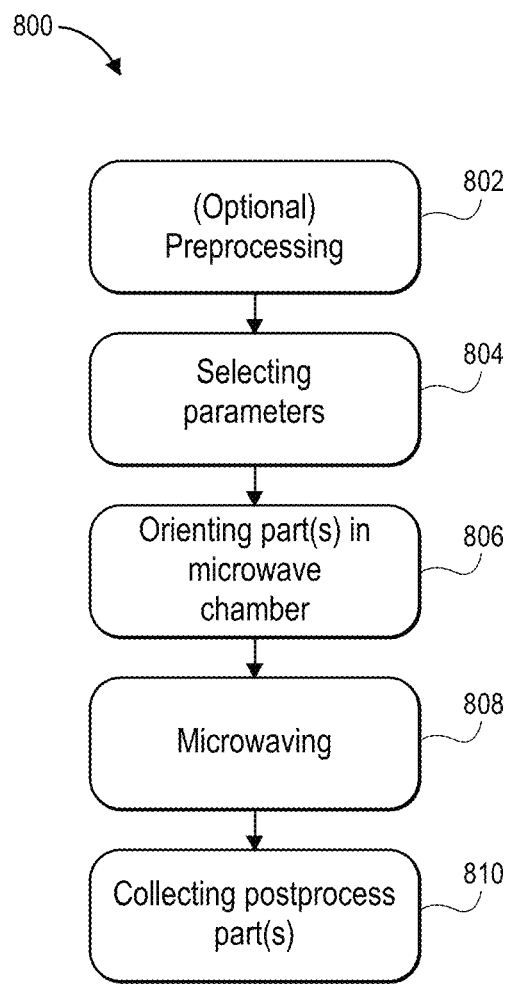
FIG. 8 depicts an exemplary method of recycling fiber-reinforced composite material according to some embodiments.

FIG. 8 depicts an exemplary method 800 of recycling fiber-reinforced composite material 12. At step 802, an optional preprocessing of the composite part 10 may be performed. In some embodiments, this preprocessing step may include one or more of the following: shredding, chopping, cutting, mulching, and any other process suitable for preparing material to be recycled. For example, an aircraft wall may need to be cut into smaller pieces in order to fit into the microwave chamber. Further, for example, a boat hull may be shredded to allow more surface area to be exposed for the fiber expulsion during microwaving, especially for a continuous microwaving process utilizing a conveyor belt system. Alternatively, in some embodiments, the microwave chamber 22 may be large enough to hold entire large parts. For example, the microwave chamber 22 may be large enough to fit an entire boat hull into the microwave chamber 22 without the preprocessing step.

At step 804, one or more parameters for the microwave system 18 may be selected. In some embodiments, the parameters selected may include any of a time of microwaving, a time for holding a target temperature, a power of the electromagnetic radiation 30, a target temperature the composite part 10, a temperature within microwave chamber 22, and a ramp rate. Composite part 10 may be microwaved for a time within a range of 1 minute to 3 hours, 5 minutes to 2 hours, 10 minutes to 1 hour, 15 minutes to 55 minutes, or 20 minutes to 50 minutes. For example, composite part 10 may be microwaved for 45 minutes. Embodiments are contemplated in which other microwaving times such as less than 1 minute and/or greater than 3 hours may be utilized if they expel at least a portion of fiber material 16 from composite part 10. In some embodiments, the target temperature may be held for a predetermined time. For example, the target temperature may be held for a time of less than 1 minute, less than 2 minutes, less than 5 minutes, within a range of 1 minute to 20 minutes, within a range of 2 minutes to 15 minutes, within a range of 5 minutes to 10 minutes, or greater than 20 minutes. For example, the target temperature may be held for 7 minutes to expel fibers from a composite part.

The frequency of electromagnetic radiation 30 provided within microwave chamber 22 may be within a range of 10 MHz to 300 gigahertz GHz, within a range of 20 MHz to 300 GHz, within a range of 100 MHz to 300 GHz, within a range of 300 MHz to 300 GHz, within a range of 1 GHz to 300 GHz or within a range of 5.85 GHz to 6.65 GHz. For example, radiation emission source 20 may provide electromagnetic radiation within a range of 27 MHz to 300 GHz. The power level of microwave system 18 may be within a range of 0% to 100%, within a range of 20% to 100%, within a range of 40% to 100%, or within a range of 60% to 100% of the maximum power output of microwave system 18. For example, microwave system 18 may be operated at a power level within the range of 40% to 100% of the maximum power output of microwave system 18. In some embodiments, the maximum power output of microwave system 18 may be within a range of 50 W to 2,000 W, within a range of 100 W to 1,000 W, within a range of 150 W to 500 W, within a range of 175 W to 250 W, within a range of 600 W to 1,700 W, within a range of 600 W to 800 W, within a range of 800 W to 1,000 W, or within a range of 1,000 W to 1,200 W. For example, the maximum power output may be 200 W for microwave system 18.

The ramp rate may be less than 15 degrees Celsius per minute (C/min), less than 10° C./min, less than 5° C./min, within a range of 1° C./min to 15° C./min, within a range of 2° C./min to 10° C./min, or within a range from 2.5° C./min to 7.5° C./min. For example, the ramp rate may be 5° C./min. The temperature within microwave chamber 22 may be within a range of 20° C. to 300° C., within a range of 50° C. to 250° C., or within a range of 100° C. to 200° C. For example, the target temperature of microwave chamber 22 may be 175° C. In some embodiments, the target temperature is within the range 170° C. to 180° C. In some embodiments, the target temperature is within the range 150° C. to 200° C. In still other embodiments, the target temperature is within the range 100° C. to 250° C.

In some embodiments, the parameters may be based at least in part on properties of the fiber-reinforced composite material 12. Additionally, or alternatively, in some embodiments, the parameters may be based at least in part on properties of the microwave system 18, such as the shape and/or size of microwave chamber 22. In some embodiments, the parameters may be selected to minimize or prevent damage (e.g., scorching or charring) to the composite part 10. Additionally, or alternatively, the parameters may be selected to expel a maximum amount of the fiber material 16 from composite part 10. For example, by minimizing damage and maximizing fiber expulsion, the leftover matrix material and expelled fibers may be suitable for recycling into new composite parts. In some embodiments, the parameters for the microwave system 18 are selected such that the microwaves interact with a particular material. For example, parameters such as microwave frequency may be selected such that the microwaves interact with the fiber material 16 without affecting the matrix material 14 or other base material.

At step 806, the composite part 10 is placed into the microwave chamber 22 of microwave system 18. The orientation of the composite part 10 may include any combination of an elevation of composite part 10 within microwave chamber 22, a position of composite part 10 within microwave chamber 22, or a rotation of composite part 10 and may be selected at least in part on properties of the microwave system 18. For example, composite part 10 may be orientated at a high microwave field strength location within microwave chamber 22. In another example, composite part 10 may be orientated at a center point within microwave chamber 22 such that the surface area of composite part 10 equally receives the electromagnetic radiation 30 from microwave system 18. The orientation of the composite part 10 may be selected at least in part on properties of the composite part 10. For example, based on the size and shape of the composite part 10, the possible orientations of composite part 10 may be limited within the space of the microwave chamber 22. In some embodiments, the composite part 10 may be placed in the center of the microwave chamber 22 to receive most of the electromagnetic radiation 30. Alternatively, in some embodiments, the composite part 10 may be oriented in a non-central position of the microwave chamber 22.

In some embodiments, the composite part 10 may be elevated from a bottom wall and/or floor of the microwave chamber 22. Embodiments are contemplated in which the composite part 10 may be elevated using elevation mechanism 25 such as, for example, any of a suspension device, an elevated platform, an elevation device, a turntable, as well as combinations thereof. For example, the composite part 10 may be elevated using a grated ceramic platform such that the composite part 10 may be elevated to a high microwave field strength location within microwave chamber 22. In some embodiments, elevating composite part 10 within microwave chamber 22 causes the composite part 10 to be a predetermined distance above the floor of microwave chamber 22. Further, the elevation of composite part 10 within microwave chamber 22 may range on the floor (i.e., a bottom interior wall) of microwave chamber 22 to the ceiling (i.e., a top interior wall) of microwave chamber 22. Accordingly, the elevation of composite part 10 within microwave chamber 22 may depend at least in part on the height of microwave chamber 22.

At step 808, the fiber-reinforced composite material 12 is microwaved using electromagnetic radiation 30. The microwaving provided to fiber-reinforced composite material 12 during step 808 may be determined by the one or more parameters selected in step 804. In some embodiments, the parameters selected may include any of a time of microwaving, a time for holding a target temperature, a power of the electromagnetic radiation 30, a target temperature the composite part 10, a temperature within microwave chamber 22, and a ramp rate as described in step 804. Microwaving the composite part 10 in the microwave chamber 22, expels the fibers from the fiber-reinforced composite material 12 until most or all of the fibers within fiber-reinforced composite material 12 are removed. In some embodiments, fiber-reinforced composite material 12 may be microwaved until a predetermined amount or percentage of fibers are removed from fiber-reinforced composite material 12. For example, fiber-reinforced composite material 12 may be microwaved until greater than 70%, greater than 75%, greater than 80%, greater than 85%, greater than 90%, greater than 95%, greater than 99%, or greater than 99.9% of fiber material 16. In some embodiments, the fiber expulsion may be due to a transient dipole effect on the fiber material 16 polarizing to the interior walls 24 of the microwave chamber 22. Expelling the fiber material 16 from the fiber-reinforced composite material 12 separates fiber-reinforced composite material 12 into a post-process matrix part 36 and the expelled fibers 38.

At step 810, the post-process matrix part 36 and expelled fibers 38 are collected separately. The expelled fibers 38 may be collected from the interior walls of the continuous microwave chamber 42 using at least one of a fiber-catching device 26, a moving mechanical collection technique, acoustical vibrations, or any other suitable collection technique. The post-process matrix part 36 may be reused to create different composite parts comprising the matrix material 14. For example, the matrix material 14 may be combined with a different fiber material to create a new composite part. Similarly, the expelled fibers 38 may be reused to create different composite parts comprising the fiber material 16. For example, the expelled fibers 38 may be inserted into a different matrix material to make a new composite part. The collected post-process materials 34 may have little to no damage after being microwaved by the electromagnetic radiation 30.

Further steps may be implemented in which after composite part 10 is microwaved, the composite part 10 may be repositioned and further microwaved. In some embodiments, the repositioning may include rotating the composite part 10 within the microwave chamber 22. For example, the composite part 10 may be rotated partially or continuously to expose the side previously face-down during the first microwaving step. Additionally, or alternatively, in some embodiments, the repositioning may include changing the location of composite part 10 within the microwave chamber 22. For example, the elevation or horizontal position of the composite part 10 within the microwave chamber 22 may change such that the composite part 10 may receive a different amount of electromagnetic radiation after repositioning compared to the first microwaving step. In some embodiments, the repositioning of the composite part 10 may be done manually by a user. Additionally, or alternatively, in some embodiments, the repositioning of the composite part 10 may be done automatically via computer program code.

In some embodiments, composite part 10 may be rotated or moved within microwave chamber 22 during the microwave process. For example, the bottom wall of the microwave chamber 22 may comprise a movable floor such that the composite part 10 may be moved during the microwaving process using a computer interface. In another example, microwave system 18 may comprise a turntable (e.g., elevation mechanism 25) to rotate and/or move composite part 10 within microwave chamber 22. In some embodiments, elevation mechanism 25 may change the elevation of composite part 10 during the microwave process. Embodiments are contemplated in which composite part 10 may be reorientated to then receive further microwaving from microwave system 18.

Further steps may be implemented in which the composite part 10 may be oriented on a conveyor belt that moves through the microwave chamber 22 in a continuous process. Additionally, or alternatively, multiple composite parts may be continuously oriented on the conveyor belt by hand or autonomously. The expelled fibers 38 may be collected from the interior walls 24 of the microwave chamber 22 using at least one of a fiber-catching device 26, a moving mechanical collection technique, acoustical vibrations, or any other suitable collection technique. Alternatively, or additionally, the expelled fibers 38 may be collected continuously or after a selected time period has passed ranging from 30 minutes to a few days. The post-process matrix part may be collected at the end of the conveyor belt via the use of collection bins or other suitable collecting techniques. Embodiments are contemplated in which the composite part 10 may take multiple trips through the microwave chamber 22 to expel most or all fibers within composite part 10. Alternatively, or additionally, embodiments are contemplated in which the composite part 10 may go through multiple microwave chambers of varying or similar parameters along the conveyor belt system. Continuous microwave systems are further described below in FIG. 9.

Further steps may be implemented in which after composite part 10 is microwaved, one or more parameters described herein may be altered in preparation for further microwaving of composite part 10. For example, a first microwaving step may be done at a lower power to the composite part 10 followed by a second microwaving step at a higher power to finish expelling the fibers from the composite part 10. In some embodiments, a first set of parameters may be selected for a first microwaving step and a second set of parameters may be selected for a subsequent microwaving step. In some embodiments, altering the parameters may be done manually by a user. Additionally, or alternatively, in some embodiments, altering the parameters may be done automatically via computer program code. Further, in some embodiments, the parameters may be changed during the microwave process.

Further steps may be implemented in which fiber-reinforced composite parts made of recycled materials may be recycled again using the steps listed above. In some embodiments, the recycled materials may be recycled multiple times. For example, a boat hull made from recycled matrix material with new fiber reinforcement may be preprocessed and microwaved to separate the matrix material again to recycle the matrix material into another composite part.

Figure 9:
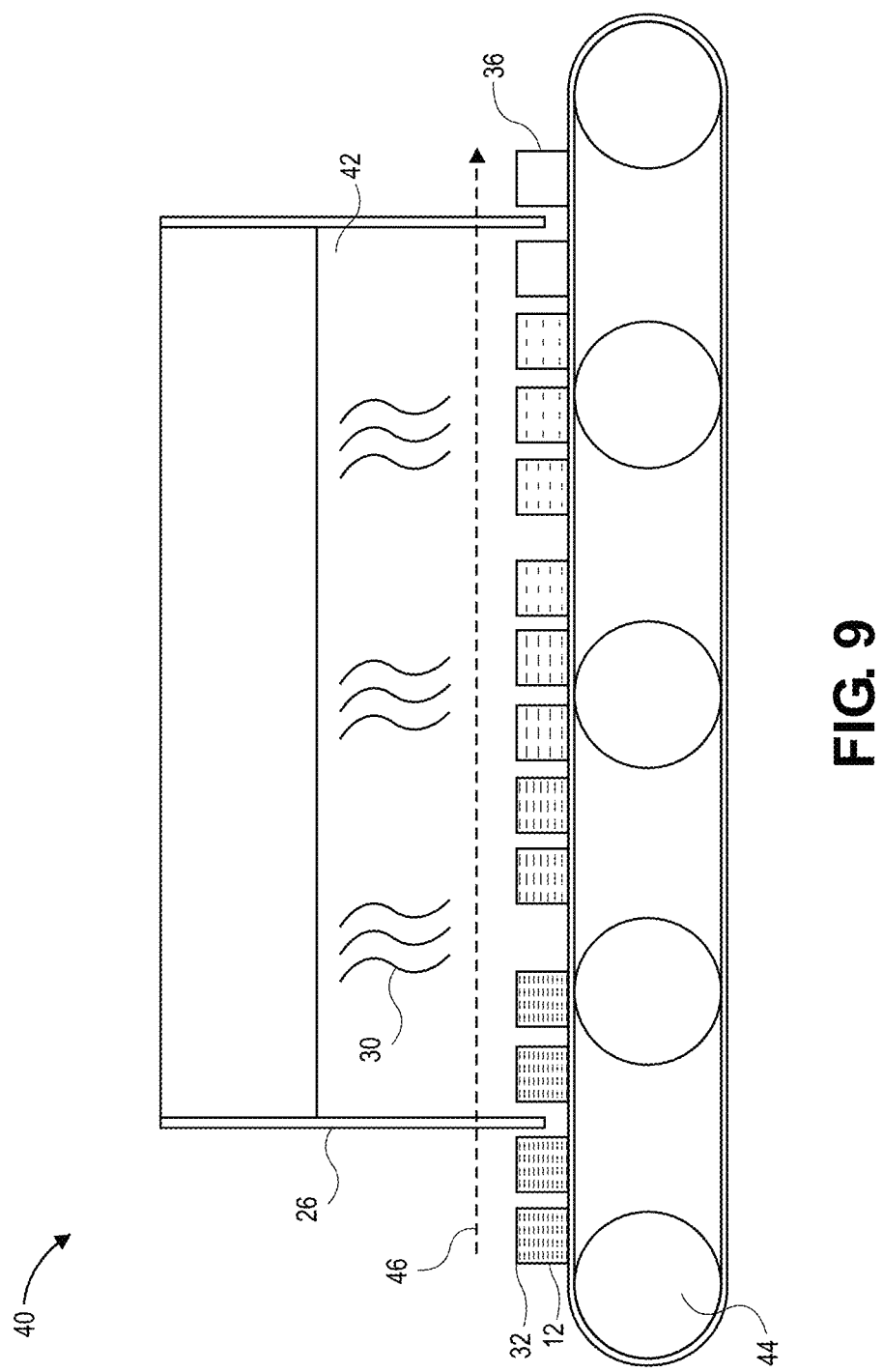
FIG. 9 depicts an exemplary continuous conveyor microwave apparatus comprising a continuous microwave chamber and a conveyor belt to move preprocessed composite parts through the continuous microwave chamber according to some embodiments.

FIG. 9 depicts an exemplary continuous microwave system 40 comprising a continuous microwave chamber 42 and a conveyor belt 44 to move one or more composite parts (e.g., composite part 10 and/or preprocessed composite part 32) through the continuous microwave chamber 42. In some embodiments, continuous microwave chamber 42 may be similar to microwave chamber 22. For example, continuous microwave chamber 42 may be defined by one or more interior walls. In some embodiments, continuous microwave chamber comprises one or more openings for allowing fiber-reinforced composite material 12 to enter and/or exit through. For example, conveyor belt 44 may lead through an opening to move fiber-reinforced composite material 12 through continuous microwave chamber 42. In some embodiments, continuous microwave chamber 42 may comprise one or more openings that in response to a force pushing against the one or more openings. For example, continuous microwave chamber 42 may comprise one or more flaps configured to flex or hinge and open when pushed against by fiber-reinforced composite material 12 moving along conveyor belt 44. As depicted in FIG. 9, fiber-catching device 26 may be one or more flaps configured to intercept fibers expelled towards an opening of continuous microwave chamber 42. Accordingly, fiber-catching device 26 may flex or hinge when pushed by fiber-reinforced composite material 12 moving along conveyor belt 44.

The conveyor belt 44 may move the one or more composite parts from a loading point of conveyor belt 44 to an end point of conveyor belt 44 in direction 46 through the continuous microwave chamber 42. In some embodiments, the conveyor belt 44 may extend past the continuous microwave chamber 42 and be utilized for other processes and transportation purposes. For example, the conveyor belt 44 may first lead to a preprocessing system that preprocesses one or more composite parts before being transported through the continuous microwave chamber 42. Further, for example, the conveyor belt may lead to a post-processing step that further prepares one or more post-process matrix parts 36 to be recycled into new fiber-reinforced composite material.

In some embodiments, multiple conveyor belts may travel through the continuous microwave chamber 42. Embodiments are contemplated in which the preprocessed composite parts 32 may take multiple trips through the continuous microwave chamber 42 to expel most or all fiber material 16 from fiber-reinforced composite material 12. For example, the preprocessed composite parts 32 may go through the continuous microwave chamber 42 in direction 46 and then go back through the continuous microwave chamber 42 in a direction opposite of direction 46. In some embodiments, the preprocessed composite parts 32 are passed through the microwave chamber for a predetermined number of cycles. Alternatively, or additionally, embodiments are contemplated in which the preprocessed composite parts 32 may go through multiple continuous microwave chambers of varying or similar parameters along the conveyor belt 44. In some embodiments, the conveyor belt 44 may divide into different tracks to sort different types of composite materials and direct them towards separate continuous microwave chambers with tuned parameters selected for the type of composite materials. Further, in some embodiments, the conveyor belt system may comprise multiple input sections where composite materials are placed onto the conveyor belt 44 and multiple output sections where the post-process materials 34 are removed from the conveyor belt 44.

In some embodiments, the conveyor belt 44 may stop for a period of time to allow the preprocessed composite parts 32 to remain within the continuous microwave chamber 42 for the period of time. In some embodiments, the time between stops may depend at least in part on the fiber-reinforced composite material 12. In some embodiments, this period of time may range from a few seconds to multiple hours. For example, the conveyor belt 44 may stop movement of the preprocessed composite parts 32 for an hour before continuing movement again. In some embodiments, the time between the stopping of the conveyor belt 44 may depend at least in part on the spacing of the preprocessed composite parts 32. Additionally, or alternatively, the time between the stopping of the conveyor belt 44 may depend at least in part on the fiber-reinforced composite material 12. In some embodiments, the speed of the conveyor belt may range from 0 meters per second to 10 meters per second.

The expelled fibers 38 may be collected from the interior walls of the continuous microwave chamber 42 using at least one of a fiber-catching device 26, a moving mechanical collection technique, acoustical vibrations, or any other suitable collection technique. For example, brushes may be utilized to remove the expelled fibers 38 from the continuous microwave chamber 42. In some embodiments, a tube insert may be placed at least partially within the continuous microwave chamber 42 such that the tube intercepts and contains the expelled fibers 38. Further, in some embodiments, the tube may move in direction 46 with the conveyor belt 44 such that the expelled fibers 38 may be collected continuously as the conveyor belt 44 moves in direction 46. The expelled fibers 38 may be collected continuously or after a selected time period ranging from 30 minutes to 5 days. For example, a thin layer deposited onto the inside walls of the continuous microwave chamber 42 may be used to catch the expelled fibers 38 and may be replaced after a predetermined amount of time has passed to prevent over-accumulation of the expelled fibers 38.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

The invention claimed is:

1. A method for removing fibers from a fiber-reinforced composite material via electromagnetic radiation to prepare for a recycling process, the method comprising:
   placing the fiber-reinforced composite material within a microwave chamber, the fiber-reinforced composite material comprising glass fibers within a polymer matrix;
   causing the glass fibers to be expelled from the polymer matrix by exposing the fiber-reinforced composite material to variable-frequency electromagnetic radiation; and
   separating the glass fibers from the polymer matrix to render the polymer matrix suitable for the recycling process.

2. The method of claim 1, further comprising:
   prior to exposing the fiber-reinforced composite material to the variable-frequency electromagnetic radiation, processing the fiber-reinforced composite material to increase a surface area of the fiber-reinforced composite material.

3. The method of claim 1, further comprising:
   prior to exposing the fiber-reinforced composite material to the variable-frequency electromagnetic radiation, covering the fiber-reinforced composite material with an electromagnetic-radiation-permeable cover to contain the glass fibers expelled from the polymer matrix.

4. The method of claim 1, wherein the fiber-reinforced composite material is exposed to the variable-frequency electromagnetic radiation to increase a temperature of the fiber-reinforced composite material at a predetermined ramp rate until the fiber-reinforced composite material reaches a predetermined target temperature and held at the predetermined target temperature for a predetermined hold time.

5. The method of claim 4, wherein the predetermined ramp rate is 5° C. per minute and the predetermined hold time is at least 7 minutes.

6. The method of claim 1, wherein the variable-frequency electromagnetic radiation is within a frequency range of 27 MHz to 300 GHz.

7. The method of claim 1, further comprising:
   after exposing the fiber-reinforced composite material to the variable-frequency electromagnetic radiation, reorientating the fiber-reinforced composite material within the microwave chamber; and
   after reorientating the fiber-reinforced composite material, exposing the fiber-reinforced composite material to further variable-frequency electromagnetic radiation.

8. A method for removing fibers from a fiber-reinforced composite material via electromagnetic radiation to prepare for a recycling process, the method comprising:
   placing the fiber-reinforced composite material within a microwave chamber, the fiber-reinforced composite material comprising reinforcing fibers within a polymer matrix;
   causing the reinforcing fibers to be expelled from the polymer matrix by exposing the fiber-reinforced composite material to variable-frequency electromagnetic radiation to increase a temperature of the fiber-reinforced composite material at a predetermined ramp rate until the fiber-reinforced composite material reaches a predetermined target temperature and held at the predetermined target temperature for a predetermined hold time; and
   separating the reinforcing fibers from the polymer matrix to render the polymer matrix suitable for the recycling process.

9. The method of claim 8, wherein the reinforcing fibers are a material selected from a set consisting of glass fibers, carbon fibers, metallic fibers, nylon fibers, organic fibers, silicon oxide fibers, or poly-para-phenylene terephthalamide fibers.

10. The method of claim 8, wherein the polymer matrix comprises diallyl phthalate.

11. The method of claim 8, wherein the fiber-reinforced composite material is exposed to the variable-frequency electromagnetic radiation by passing it through the microwave chamber on a conveyor belt for a predetermined number of cycles.

12. The method of claim 8, wherein the predetermined target temperature is within a range from 170° C. to 180° C.

13. The method of claim 8, wherein the predetermined ramp rate is at least 5° C. per minute.

14. The method of claim 8, wherein the variable-frequency electromagnetic radiation is in a frequency range of 5.85 Ghz to 6.65 GHz.

15. A method for removing fibers from a fiber-reinforced composite material via electromagnetic radiation, the method comprising:
   placing the fiber-reinforced composite material within a microwave chamber, the fiber-reinforced composite material comprising reinforcing fibers within a polymer matrix;
   causing the reinforcing fibers to be expelled from the polymer matrix by exposing the fiber-reinforced composite material to variable-frequency electromagnetic radiation to increase a temperature of the fiber-reinforced composite material at a predetermined ramp rate until the fiber-reinforced composite material reaches a predetermined target temperature and held at the predetermined target temperature for a predetermined hold time; and
   collecting the reinforcing fibers expelled from the polymer matrix.

16. The method of claim 15, wherein the reinforcing fibers are chopped-glass fiber fibers.

17. The method of claim 15, wherein the reinforcing fibers are continuous fiber reinforcement fibers.

18. The method of claim 15, wherein the variable-frequency electromagnetic radiation is in a frequency range of 10 MHz to 300 GHz.

19. The method of claim 15, wherein the reinforcing fibers are collected from a sacrificial, microwave-permeable coating of the microwave chamber.

20. The method of claim 15, wherein the fiber-reinforced composite material is exposed to the variable-frequency electromagnetic radiation for a time within a range of 5 minutes to 2 hours.

* * * * *